(12) United States Patent
Logan et al.

(10) Patent No.: US 10,982,494 B2
(45) Date of Patent: Apr. 20, 2021

(54) FLUID DISCHARGE SUPPRESSOR

(71) Applicant: Stuart Petroleum Testers, LLC, The Woodlands, TX (US)

(72) Inventors: Jeremy Logan, Broussard, LA (US); Robert Wright, Houston, TX (US); Ernie Bergeron, Madisonville, LA (US); Huey Kliebert, New Orleans, LA (US)

(73) Assignee: STUART PETROLEUM TESTERS, LLC, The Woodlands, TX (US)

( * ) Notice: Subject to any disclaimer, the term of this patent is extended or adjusted under 35 U.S.C. 154(b) by 0 days.

(21) Appl. No.: 16/546,302

(22) Filed: Aug. 21, 2019

(65) Prior Publication Data

US 2020/0063504 A1 Feb. 27, 2020

Related U.S. Application Data

(60) Provisional application No. 62/720,575, filed on Aug. 21, 2018.

(51) Int. Cl.
*E21B 19/00* (2006.01)
*F16L 55/115* (2006.01)

(52) U.S. Cl.
CPC .......... *E21B 19/00* (2013.01); *F16L 55/1152* (2013.01)

(58) Field of Classification Search
CPC ........ E21B 19/00; E21B 33/076; E21B 33/08; F16L 55/1152
See application file for complete search history.

(56) References Cited

U.S. PATENT DOCUMENTS

| | | |
|---|---|---|
| 2,639,674 A | 5/1953 | Reese |
| 3,050,121 A | 8/1962 | Garrett |
| 3,412,806 A | 11/1968 | Fredd |
| 3,454,084 A | 7/1969 | Sizer |
| 3,601,190 A | 8/1971 | Mott |
| 4,434,853 A | 3/1984 | Bourgeois |

(Continued)

FOREIGN PATENT DOCUMENTS

| | | |
|---|---|---|
| CA | 2600740 C | 1/2014 |
| GB | 1151511 A | 5/1969 |

(Continued)

OTHER PUBLICATIONS

Louisiana State University, Craft & Hawkins Department of Petroleum Engineering; Review of Recent Diverter Performance during Well Control Emergencies; Bourgoyne, Jr., Adam T., PE, PHD, 2006 (est).

(Continued)

*Primary Examiner* — James G Sayre
(74) *Attorney, Agent, or Firm* — Mackey Law Firm PLLC

(57) ABSTRACT

A fluid discharge suppressor can include a body having one or more internal spaces, a first cap adapted to be coupled to the body, a second cap adapted to be coupled to the first cap, and one or more ports for allowing fluid flow out of the body. A suppressor can be adapted for allowing a wireline to pass therethrough and one or more caps can be adapted to hold a packing element. A suppressor can include one or more fluid deflectors for biasing fluid flow toward one or more ports. A suppressor can be adapted to couple with a pack-off or other well equipment for suppressing fluid discharge therefrom.

30 Claims, 5 Drawing Sheets

(56) References Cited

U.S. PATENT DOCUMENTS

| | | | |
|---|---|---|---|
| 4,513,823 | A | 4/1985 | Hynes et al. |
| 4,542,787 | A | 9/1985 | Parker |
| 4,703,807 | A | 11/1987 | Weston |
| 4,781,607 | A | 11/1988 | Rumbaugh |
| 5,392,861 | A | 2/1995 | Champagne |
| 5,575,336 | A | 11/1996 | Morgan |
| 6,253,856 | B1 | 7/2001 | Ingram et al. |
| 6,810,954 | B2 | 11/2004 | Garrett et al. |
| 7,410,003 | B2 | 8/2008 | Ravensbergen et al. |
| 7,607,485 | B2 | 10/2009 | Fenton et al. |
| 7,721,800 | B2 | 5/2010 | Symons et al. |
| 8,365,819 | B2 | 2/2013 | Murphy et al. |
| 8,905,128 | B2 | 12/2014 | Niconoff |
| 9,850,728 | B2 | 12/2017 | Wessel |
| 2005/0178540 | A1 | 8/2005 | Siewert |
| 2016/0230520 | A1 | 8/2016 | Steele et al. |
| 2017/0204667 | A1 | 7/2017 | McCormack et al. |
| 2018/0209237 | A1* | 7/2018 | King ............... F16J 15/004 |

FOREIGN PATENT DOCUMENTS

| | | |
|---|---|---|
| WO | 2011137112 A2 | 6/2012 |
| WO | 2017034977 A1 | 3/2017 |
| WO | 2017122008 A1 | 7/2017 |

OTHER PUBLICATIONS

University of Stavanger, Deep Water Well Intervention and Fluid Selection, Dulger, Merve, Jun. 12, 2012.
Wireline apparatus, pack-off, Wikipedia 2018.

* cited by examiner

FLUID DISCHARGE SUPPRESSOR

CROSS REFERENCE TO RELATED APPLICATIONS

This application claims the benefit of U.S. Provisional Patent Application No. 62/720,575 filed Aug. 21, 2018, the entire contents of which are hereby incorporated by reference into this application.

BACKGROUND OF THE INVENTION

1. Field of the Invention

The present disclosure relates generally to the field of oil and gas exploration and more specifically relates to devices for containing, routing or otherwise controlling fluid discharged from or through a pack-off, such as during wireline operations on an oil and/or gas well.

2. General Background

In the oil and gas industry, the term wireline usually refers to a cabling technology used by operators of oil and gas wells to lower equipment or measurement devices into the well for the purposes of well intervention, reservoir evaluation or pipe recovery.

In wireline wellheads, as the braided wire, cable, rope or electrical conductor enters or leaves the wellhead, it is common for a considerable amount of grease, oil, lubricants or other contaminants to become attached to and then drip or otherwise come off the wireline, the top sheave and/or related equipment. These unrestrained pollutants may eventually find their way into nearby water and/or soil. Thus, these pollutants should be properly managed to ensure minimal impact to the environment.

Some attempts to retain pollutants within wireline wells include the use of pack-offs or oil strippers. Pack-offs provide a seal around a wireline for confining well fluids and gases within a well or pressure control stack and include flexible, usually elastomeric sealing elements used to seal around an irregular surface such as a wireline. These devices strip the pollutants off the wireline as it is pulled out of the well. Additionally, there are grease injectors which pump grease or other high viscosity material into pressurized wells so as to maintain pressure therein. Grease injectors can be used in conjunction with the pack-offs or oil strippers to retain such pollutants within the well and pack-offs can be tasked with stripping grease off of the wireline as it is pulled through the pack-off. In at least some cases, pack-offs include sliding pistons through which wirelines are routed and hydraulic pressure can be used to control engagement between the piston (and/or elastomeric packings) and the wireline.

While at least some known devices may be suitable for use in some applications, a shortcoming involves the uncontrolled or undesired leakage of fluids or other substances from a pack-off or stuffing box, which can result in costly and time-consuming downtime. For instance, well fluids, grease and other substances can escape from the top of a pack-off during wireline operations, such as due to worn sealing components or other conditions that result in fluid loss from the pack-off. Accordingly, a need exists in the art for a more reliable manner of preventing or minimizing unwanted fluid discharge during wireline operations.

The present disclosure is directed to improved devices, systems and methods for managing fluid discharge from a pack-off or stuffing box. In at least one embodiment, there is provided a fluid discharge suppressor for containing, routing or otherwise controlling fluid discharged from or through a pack-off, such as during wireline operations on an oil and/or gas well.

BRIEF SUMMARY OF THE INVENTION

In at least one embodiment, a fluid discharge suppressor can include a body having a first end, a second end and one or more spaces, such as a first internal space, one or more first or other caps adapted to be coupled to the first end, one or more second or other caps adapted to be coupled to a first cap, and one or more fluid ports or other openings in or through one or more walls or other portions of the body and in fluid communication with the first internal space or other portion(s) of the body. In at least one embodiment, a first cap and a second cap can have one or more central longitudinal openings or other openings, which can be adapted for allowing a wireline to pass therethrough. One or more caps can be adapted to receive one or more packing elements. One or more caps can be adapted to at least partially resist removal of a packing element from one or more caps. In at least one embodiment, a fluid discharge suppressor can include one or more fluid deflectors disposed at least partially within an internal space, which can include being coupled to one or more components of the device or system. In at least one embodiment, a fluid discharge suppressor can include a body having an end or other portion adapted to couple with a pack-off.

In at least one embodiment, a fluid discharge suppressor can include a barrier that at least partially separates a first internal space from a second internal space, such as of or within the body or a portion thereof. One or more internal spaces or one or more portions thereof can be adapted to receive at least a portion of a pack-off. In at least one embodiment, a fluid discharge suppressor can include a groove or other coupler disposed in a radially exterior surface or other portion of the body. One or more grooves or other couplers can be adapted to couple with one or more clamps. One or more grooves can be adapted to circumscribe or otherwise at least partially surround at least a portion of a pack-off, which can include when the fluid discharge suppressor is coupled to a pack-off. In at least one embodiment, one or more barriers can include a central longitudinal or other opening adapted to couple with at least a portion of a pack-off.

A barrier can include a top or other portion at least partially disposed within one or more internal spaces and, in at least one embodiment, the top of the barrier can be or include a floor or other portion of one or more internal spaces. In at least one embodiment, a fluid discharge suppressor can include a floor wherein at least a portion of the floor slopes downwardly, such as in a radial direction about a central longitudinal axis of the fluid discharge suppressor. In at least one embodiment, a fluid discharge suppressor can include one or more wear bushings, which can include one or more bushings coupled to one or more packing elements. In at least one embodiment, a fluid discharge suppressor can include a body having one or more longitudinal or otherwise arranged slots or other openings, which can include one or more slots or other openings adapted to couple with or receive at least a portion of a pack-off.

In at least one embodiment, a fluid discharge suppressor can include one or more fluid ports, which can include two fluid ports disposed radially or otherwise opposite one another, such as about an axis, plane or other reference. In at least one embodiment, a fluid discharge suppressor can include one or more fluid deflectors having a concave, convex, curved, or otherwise shaped portion for deflecting fluid away from one or more locations or toward one or more locations. In at least one embodiment, one or more fluid deflectors can include a tubular wall or other portion disposed within an interior of the body. In at least one embodiment, a fluid discharge suppressor can include a gap radially between an exterior surface or other portion of a fluid deflector and one or more other portions of the device, such as an interior or other surface of the body. In at least one embodiment, a fluid discharge suppressor can include one or more conduits coupled to one or more ports, such as by way of fluid fittings, for routing fluid to one or more locations, which can include one or more storage tanks or other areas.

In at least one embodiment, a fluid discharge suppressor can include one or more vent holes through the first cap. One or more vent holes can be disposed radially between an exterior surface of a fluid deflector or a portion thereof, such as a tubular or other wall, and an interior surface of the suppressor or a portion thereof. One or more vent holes can be disposed in fluid communication with one or more gaps. In at least one embodiment, a fluid discharge suppressor or a portion thereof, such as one or more fluid deflectors, can be configured to receive and redirect fluid discharged from a pack-off or other well equipment.

In at least one embodiment, a fluid discharge suppressor can include a body having a first end with a first internal space and a longitudinally opposite second end with a second internal space, a first cap adapted to be removably coupled to the first end; a second cap adapted to be removably coupled to the first cap; an at least partially tubular wall coupled to the first cap and configured to be disposed at least partially within the first internal space; and one or more fluid ports through one or more walls of the body and in fluid communication with the first internal space. The first cap and the second cap can have central longitudinal openings for allowing a wireline to pass therethrough. The first cap can be adapted to receive one or more packing or sealing elements. The second cap can be adapted to at least partially resist removal of packing or sealing element from the first cap. The second end of the body can include an opening for allowing a wireline to pass therethrough. A fluid discharge suppressor can include two fluid ports disposed at 180 degrees from one another. One or more slots in the body (if present) can be disposed radially between the ports, such as 90 degrees from a port. Two or more ports or slots can be radially disposed in any position about an axis of the body relative to one another according to an implementation of the disclosure. One or more internal spaces of a suppressor can be at least partially separated by a barrier comprising at least one opening configured for allowing a wireline to pass therethrough. A suppressor or a portion thereof, such as one or more ends, can be configured to couple with at least one of a pack-off and a stuffing box, which can include receiving at least a portion of a pack-off or stuffing box therein.

DETAILED DESCRIPTION OF THE INVENTION

Figure 1:
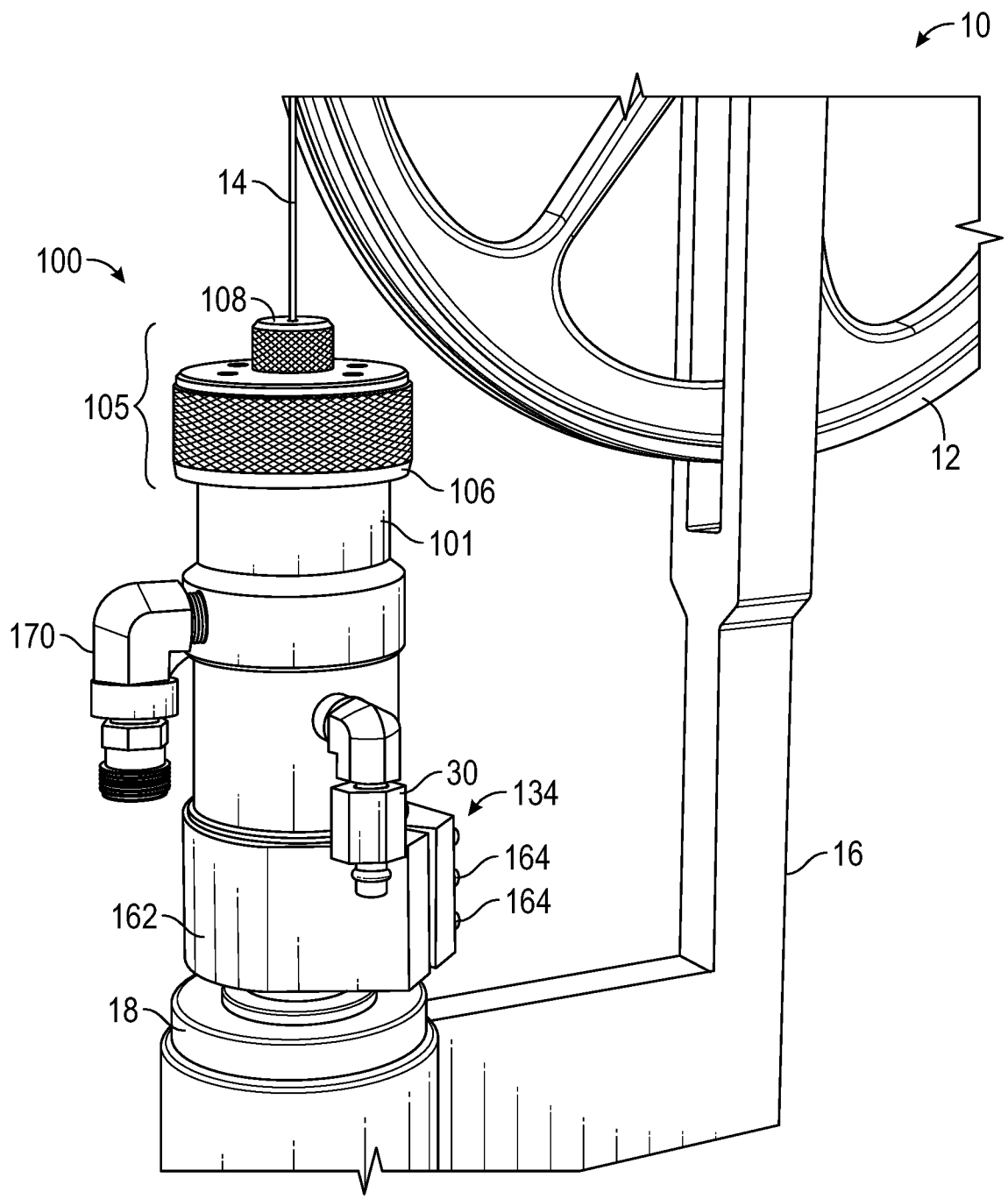
FIG. 1 is a perspective view of one of many embodiments of a wireline system having a fluid discharge suppressor according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the present disclosure are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the disclosure. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Applicants have created devices, systems and methods for containing, routing or otherwise controlling or supporting fluid discharged from or through a pack-off, such as during wireline operations on an oil and/or gas well. In at least one embodiment, which is but one of many, a fluid discharge suppressor according to the present disclosure can include a body, one or more caps, one or more internal spaces and one or more ports for routing fluid from an interior of the body to an exterior of the body, which can include directing fluid to one or more tanks or other storage areas, such as via one or more fluid flow paths, which can include one or more conduits, pipes, fittings, valves, seals or other fluid system components, separately or in combination. A fluid discharge suppressor according to the present disclosure can at least partially prevent uncontrolled or undesired fluid egress from a pack-off or stuffing box and can at least partially reduce the occurrence of costly and time-consuming downtime.

Figure 2:
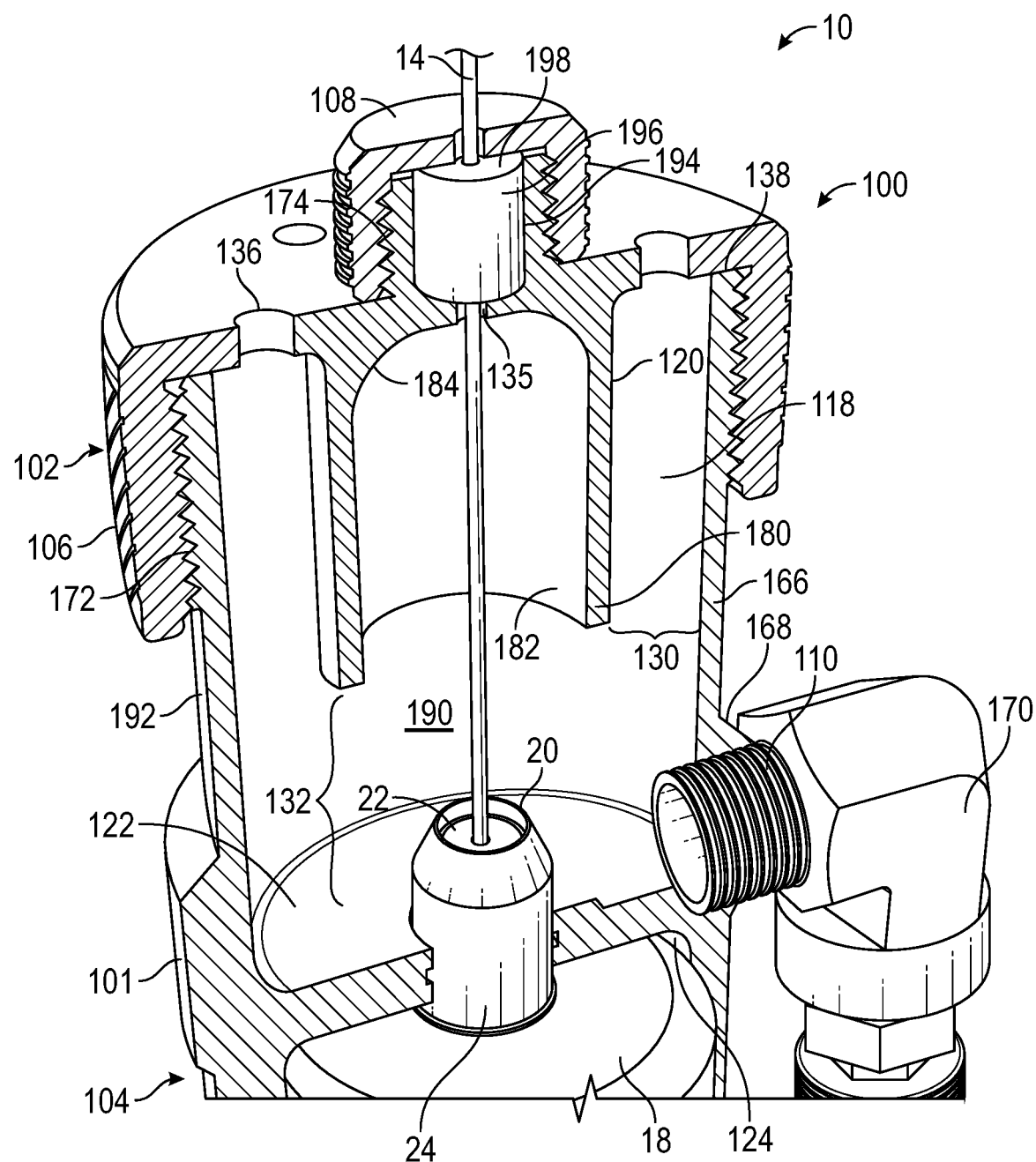
FIG. 2 is a partial cross-sectional perspective view of the system of FIG. 1.
Figure 3:
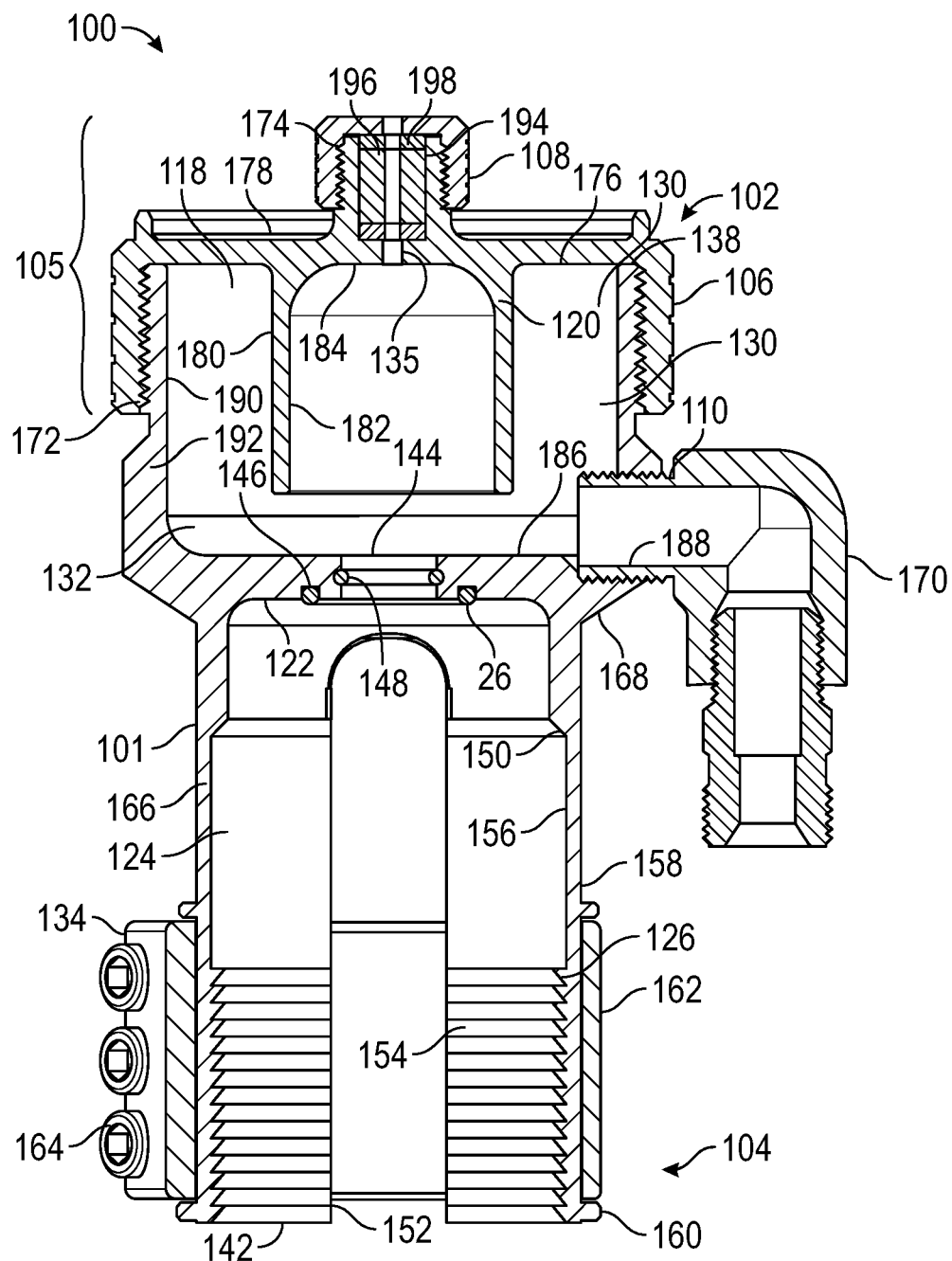
FIG. 3 is a cross-sectional side view of one of many embodiments of a fluid discharge suppressor according to the disclosure.
Figure 4:
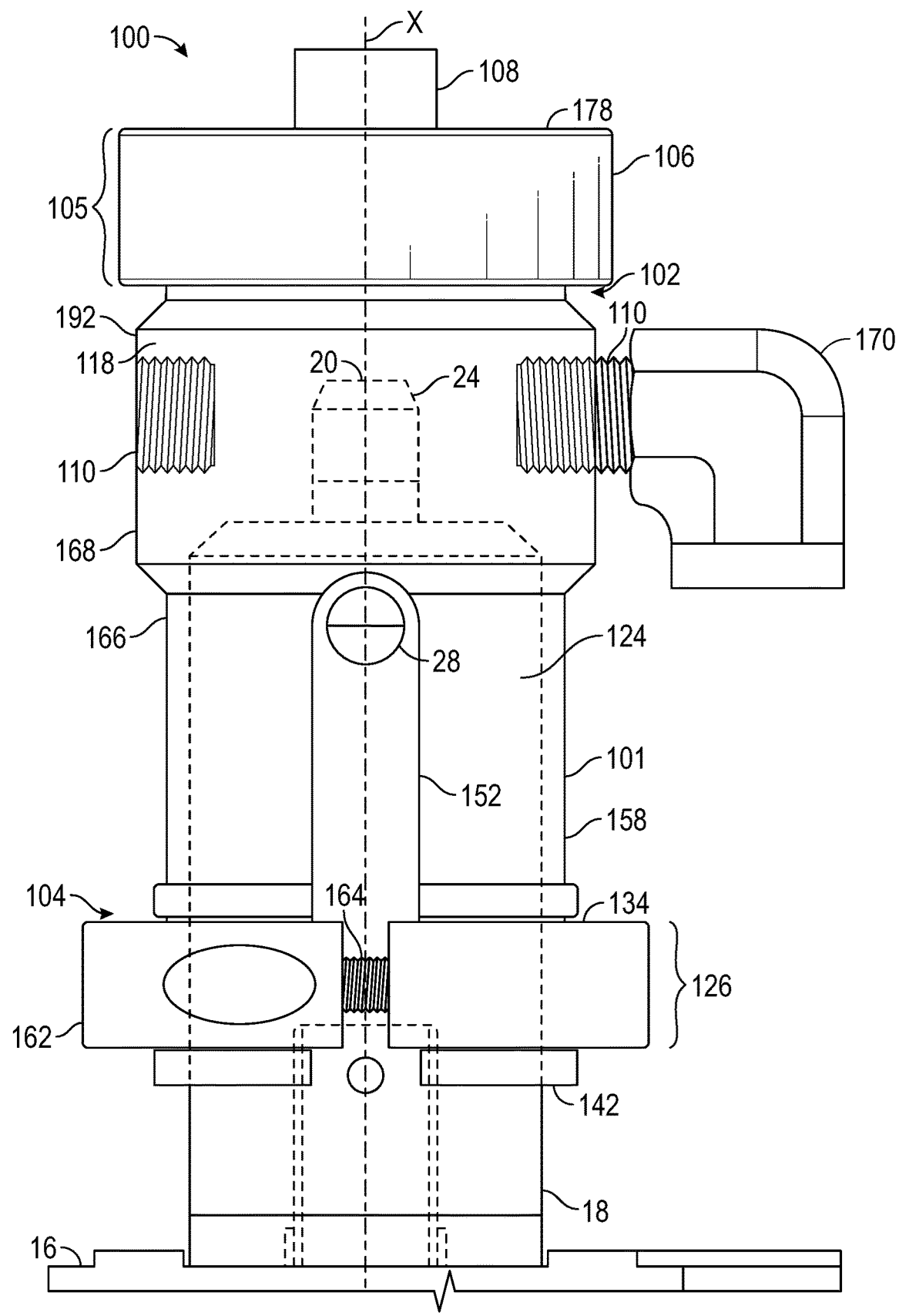
FIG. 4 is a cross-sectional schematic view of another of many embodiments of a fluid discharge suppressor coupled to a pack-off according to the disclosure.
Figure 5:
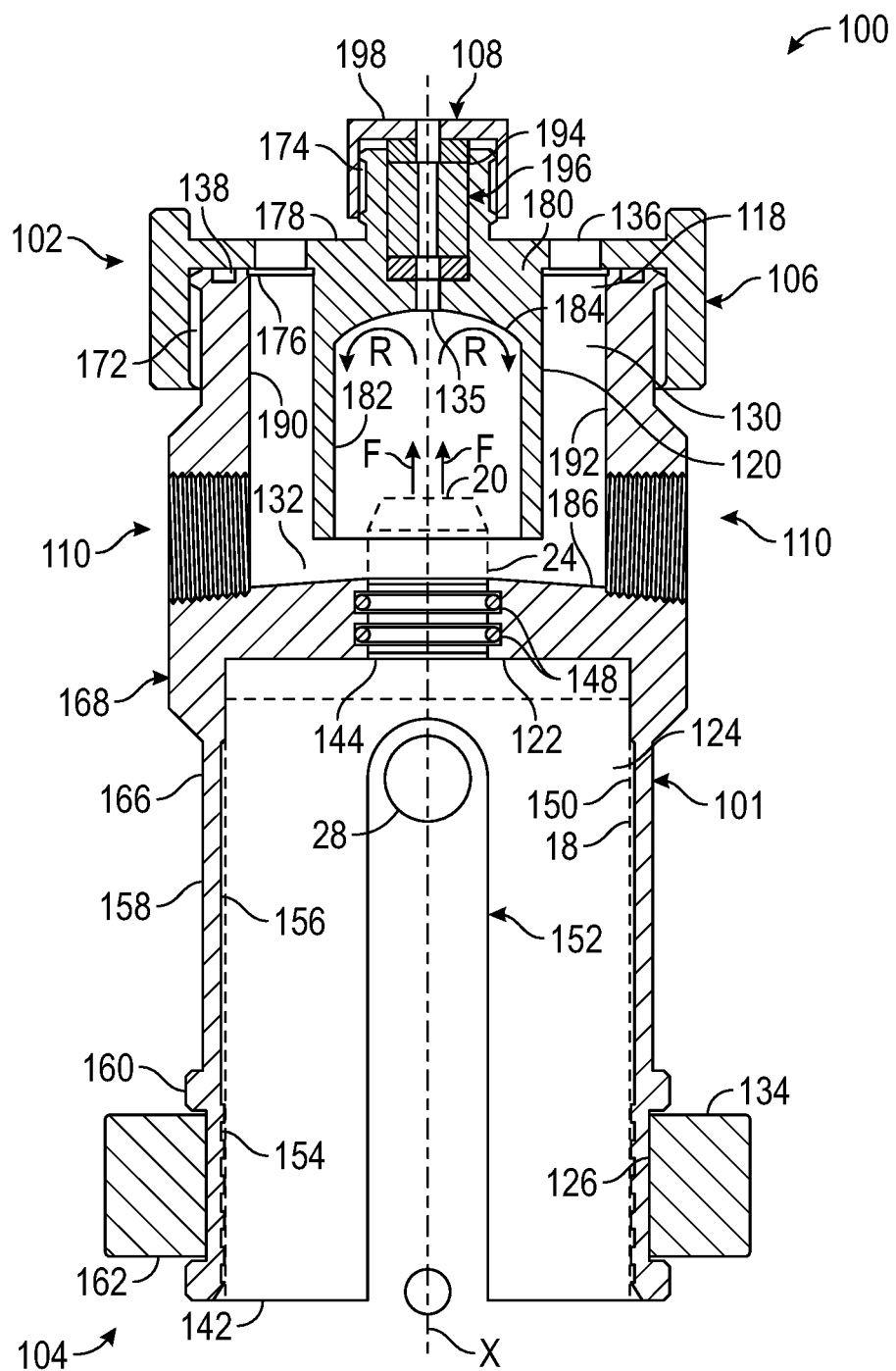
FIG. 5 is a cross-sectional side view of yet another of many embodiments of a fluid discharge suppressor according to the disclosure.

FIG. 1 is a perspective view of one of many embodiments of a wireline system having a fluid discharge suppressor according to the disclosure. FIG. 2 is a partial cross-sectional perspective view of the system of FIG. 1. FIG. 3 is a cross-sectional side view of one of many embodiments of a fluid discharge suppressor according to the disclosure. FIG. 4 is a cross-sectional schematic view of another of many embodiments of a fluid discharge suppressor coupled to a pack-off according to the disclosure. FIG. 5 is a cross-sectional side view of yet another of many embodiments of a fluid discharge suppressor according to the disclosure. FIGS. 1-5 will be described in conjunction with one another.

In at least one embodiment, a wireline system 10 according to the disclosure can include one or more sheaves 12 for supporting movement of a wireline 14 into or out of a wellbore. Sheave 12 can be rotatably coupled to a support structure 16, such as a system of support members, for operably positioning sheave 12, wireline 14 and/or other wireline components relative to a wellbore or wellhead (not shown). System 10 can include one or more pack-offs 18 for providing a seal around wireline 14 during wireline operations, such as for at least partially confining well fluids, lubricants, grease and other substances within a well or other equipment coupled between pack-off 18 and a well (e.g., valves, lubricators, grease injectors, blowout preventers, risers, tool catchers and other equipment utilized during wireline operations). Pack-off 18 can include one or more fluid openings 20 for allowing fluid (e.g., hydraulic fluid) into and/or out of pack-off 18 for operating or controlling one or more aspects or functions of pack-off 18, such as for compressing or moving one or more sealing elements 22 about or relative to wireline 14.

As depicted in, e.g., FIG. 2 for illustrative purposes, one or more sealing elements 22 of a pack-off 18 can be or include a slidable, piston-like element; however, this need not be the case and other types of pack-offs and sealing/wiping elements are known in the art. Regardless of the particular type of pack-off 18 utilized in an implementation of wireline system 10, whether now known or later developed, pack-off 18 can include one or more openings or junctions through which one or more fluids or other substances can at least potentially exit pack-off 18, such as a wireline opening 20 through which wireline 14 passes during wireline operations. System 10 can include one or more fluid discharge suppressors 100 (or "suppressor 100" for short) according to the disclosure for suppressing or otherwise controlling the flow of such fluid(s) or other substance(s). As used herein in the context of material(s) suppressed or otherwise controlled by suppressor 100, the term "fluid(s)" includes any material capable of emanating from a pack-off or other wireline or well equipment, including liquids, gases and combinations thereof regardless of whether solids or substances of other state(s) are included therein or therewith. In at least one embodiment, suppressor 100 can be configured to couple with pack-off 18 as further described below. As another example, while a pack-off 18 is shown in the figures for exemplary purposes, in at least one embodiment, system 10 can include one or more other wireline devices, such as a stuffing box or other equipment for forming an at least partial seal with wireline 14 (not shown), whether separately or in combination with one or more pack-offs 18, and suppressor 100 can be configured to couple with such stuffing box or other equipment (and/or pack-off 18, if present). Embodiments of the disclosure are described with reference to a pack-off 18 for purposes of illustration and convenience, but it should be understood that such references to pack-off 18 likewise apply to stuffing boxes or such other equipment with which one or more embodiments of a suppressor 100 according to the disclosure can be utilized.

In at least one embodiment, a fluid discharge suppressor 100 according to the disclosure can include a body 101 for at least partially enclosing, holding or otherwise supporting one or more other components or portions of suppressor 100. Body 101 can have one or more ends, such as first end 102 and second end 104, which can be adapted for cooperating with one or more other components of suppressor 100 or of a system in which suppressor 100 may be incorporated. Body 101 can be at least partially hollow and can have one or more interior openings or spaces. For instance, in at least one embodiment, suppressor 100 can be at least partially tubular and can have a first internal space 118 and a second internal space 124, which can be at least partially separated from one another by one or more barriers 122, such as a wall or other boundary. Barrier 122 can include one or more openings therein or therethrough as further described below. Barrier 122 can, but need not, be formed integrally with one or more portions of body 101, in whole or in part. As shown in the figures for illustrative purposes, body 101 can, in at least one embodiment, be or include an integrally formed, unitary structure. However, this need not be the case, and alternatively, or collectively, body 101 can include a plurality of portions or components coupled to one another, such as mechanically, by welding, or otherwise. Suppressor 100 or one or more components thereof, such as body 101, can be made from any material according to an implementation of the disclosure, including, but not limited to, steel, aluminum, or other metals, separately or in combination, in whole or in part.

In at least one embodiment, suppressor 100 can be configured to couple with a pack-off 18 or other oil well equipment from which fluids or other substances may be discharged (whether sporadically or otherwise), such as a stuffing box or another device through which a wireline passes during well operations, and to suppress or control such fluids or other substances. For example, second end 104 can be configured to couple to a pack-off 18 in an at least partially fluid tight manner for routing fluid discharged from pack-off 18 toward first end 102, such as into first internal space 118. Further, suppressor 100 can be configured for routing such fluid out of first internal space 118 in a controlled manner or as otherwise desired according to an implementation of the disclosure. Suppressor 100 or a component thereof, such as body 101, can include one or more openings or ports for supporting fluid flow into and/or out of suppressor 100 or a portion thereof and/or for supporting coupling with or among one or more components of suppressor 100 or a system in which suppressor 100 may be incorporated. For example, second end 104 can include one or more openings 142 for coupling with pack-off 18, which can include receiving at least a portion of pack-off 18 therethrough. Barrier 122 can include one or more openings 144 for supporting fluid communication between internal spaces 118, 124. Opening(s) 144 can, but need not, be or include the same opening through which wireline 14 may pass. Similarly, opening(s) 144 can, but need not, be or include one or more openings for receiving or otherwise coupling with at least a portion of a pack-off 18, such as a piston 24 or other portion or component of a pack-off 18 (if present) according to an implementation of the disclosure or for instance according to a particular type or model of pack-off 18 or another fluid discharging device with which suppressor 100 may be utilized. One or more openings 144 can, but need not, be concentric about or otherwise situated along an axis of suppressor 100, such as, for example, central longitudinal axis X. As another example, suppressor 100 or a portion thereof, such as body 101 or barrier 122, can include one or more openings 146 for coupling with or supporting coupling with one or more other system components. For instance, one or more openings 146, which may be or include through or partial openings or holes, can be adapted for supporting alignment of a pack-off 18 or other device relative to suppressor 100, such as by receiving or mating with one or more pins, tongues, or other structures on pack-off 18 (not shown). Alternatively, or collectively, one or more openings 146 can be or include one or more grooves, such as an annular groove, for supporting fluid tight coupling with pack-off 18. As best seen in FIG. 3, for example, in at least one embodiment, which is but one of many, pack-off 18 can include one or more seals 26, such as an O-ring or other elastomeric or non-elastomeric seal, and opening 146 can be or include one or more grooves or other structures for sealingly engaging or otherwise coupling with one or more seals 26. Similarly, in at least one embodiment, opening 144 can include one or more seals 148 for sealingly engaging one or more other portions of a pack-off 18, such as a piston 24 or other component of pack-off 18 disposed in or through opening 144. Of course, the presence or absence of such features can depend on the type of pack-off 18 or other device to which an implementation of suppressor 100 may be coupled in suppressor 100 can be configured for coupling with any such pack-off 18 or other device as may be required or desired according to an implementation of the disclosure.

Second end 104 can be configured to couple with pack-off 18 in any manner according to an implementation of the disclosure. As shown in the figures for illustrative purposes, in at least one embodiment, second end 104 can be sized and shaped for being disposed over or around at least a portion of a pack-off 18, which can, but need not, include being of a circular cross-section. Opening 142 can be sized and shaped for cooperating with pack-off 18, which can be or include any pack-off according to an implementation of disclosure, and internal space 124 can receive at least a portion of pack-off 18 therein. Second end 104 or internal space 124 can include one or more internal dimensions, whether diameters or otherwise, for accepting or coupling with pack-off 18. In at least one embodiment, suppressor 100 can include one or more shoulders 150 and pack-off 18 can include a corresponding structure or shape for engaging or resting against a shoulder 150 upon being coupled with suppressor 100, whether separately or in combination with any contact between pack-off 18 and barrier 122 or a portion thereof.

In at least one embodiment, pack-off 18 can include one or more fluid ports 28 for allowing fluid flow into or out of pack-off 18, which can include one or more fluid fittings 30 for coupling hoses, pipes, or other fluid conduits with pack-off 18. For instance, in at least one embodiment, which is but one of many, pack-off 18 can be a hydraulically actuated or controlled pack-off and a fluid port 28 can support the flow of hydraulic fluid into or out of pack-off 18 for controlling sealing engagement between piston 24 (or one or more other packings) and wireline 14. In such an embodiment, and/or in other embodiments, suppressor 100 or a portion thereof, such as body 101 or second end 104, can be adapted to allow for or otherwise cooperate with one or more fittings 30 or other structures that may protrude outwardly or otherwise from the body of pack-off 18. For instance, suppressor 100 can include one or more slots 152, such as cutouts or other openings, in body 101 or second end 104 for receiving one or more fittings 34 or other portions of pack-off 18 and supporting coupling between pack-off 18 and suppressor 100. Suppressor 100 can include any number of slots 152 according to an implementation of the disclosure and slots 152 can be of any shape or size according to an implementation of the disclosure. One or more slots 152, if present, can, but need not, intersect or be contiguous with one another or for instance with opening 142.

In at least one embodiment, suppressor 100 can include one or more structures for supporting coupling engagement among suppressor 100 and pack-off 18. For instance, suppressor 100 can include one or more compressible or deformable (whether plasticly or elastically) couplers 154 on an interior surface 156 thereof for engaging or otherwise coupling with, e.g., an exterior or other portion of pack-off 18. In at least one embodiment, coupler 154 can be or include metal, plastic, rubber, or other ridges or grapple ridges for at least partially resisting uncoupling of pack-off 18 and suppressor 100. In at least one embodiment, coupler 154 can be or include one or more seals, such as O-rings or the like. As another example, suppressor 100 can include one or more couplers on an exterior surface 158 supporting coupling with pack-off 18. For instance, suppressor 100 can include one or more grooves 126 formed on or in body 101. Groove 126 can include two or more walls 160, such as continuous or non-continuous barriers, and suppressor 100 can include one or more clamps 134 for cooperating with one or more grooves 126 and coupling about body 101 or a portion thereof to resiliently or otherwise couple suppressor 100 to a pack-off 18. In at least one embodiment, clamp 134 can include two or more arms 162 adapted to fit around the exterior of body 101 or second end 104 and to compress body 101 radially inwardly and onto or against the exterior of pack-off 18, such as by way of tightening one or more fasteners 164 adapted for biasing arms 162 toward one another. In one or more of these manners, and/or one or more other manners according to an implementation of the disclosure, a pack-off 18 and suppressor 100 can be coupled to one another so as to resist uncoupling and/or leaking during well operations and such that any fluids or other substances discharged from pack-off 18 during operations (e.g., from the top of pack-off 18 with reference to the orientation of the drawings, such as via the opening in piston 24 through which wireline 14 may be routed) can be directed into first internal space 118 of suppressor 100.

Turning back now to the first end 102 of suppressor 100, it will be appreciated that first internal space 118 can be adapted for receiving fluids or other substances discharged from pack-off 18 or another device coupled to second end 104 of suppressor 100. In addition, suppressor 100 can be adapted for at least partially resisting uncontrolled flow of such substances and, in at least one embodiment, for controlling or directing flow of such substances to route the flow to a desired location for storage, containment, disposal, or other disposition. Suppressor 100 can be adapted for routing fluid flow out of one or more fluid ports 110 in fluid communication with first internal space 118. Suppressor 100 can have any number of ports 110 according to an implementation of the disclosure, such as one (see, e.g., FIGS.

1-3), two (see, e.g., FIGS. 4-5) or more ports 110. While the single and dual port embodiments shown in the Figures are suitable or advantageous for numerous implementations of suppressor 100, suppressor 100 can include any number of ports 110 required or desired for an implementation of the disclosure, such as 3, 4, 5, 6 . . . n ports 110. Each port 110 can be disposed in or through a wall 166 of body 101, which can but need not include being located in a flanged or collared portion 168 of body 101, such a portion of body 101 having a thickness adequate for supporting one or more ports 110, which thickness can, but need not, be uniform along all or a portion of body 101. Each port 110 can be of any size, shape and connection type according to an implementation of the disclosure and can be positioned in any location relative to, e.g., axis X. In an embodiment of suppressor 100 having a plurality of ports 110, which is but one of many, the ports 110 can be symmetrically or asymmetrically spaced or otherwise positioned about axis X. As shown in the Figures for illustrative purposes, one or more ports 100 can have threads for threadedly coupling with one or more fluid fittings 170 (e.g., elbows, straight couplers, pipe nipples, splitters, quick-disconnect fittings, etc.). Alternatively, or collectively, each port 110 can include any type of coupler(s) for coupling with any type of fluid fitting 170 according to an implementation of the disclosure. In at least one embodiment, which is but one of many, one or more ports 110 can be or include a fixed or permanently attached port or fitting (e.g., a barbed hose connection). As will be appreciated, one or more ports 110 and fittings 170 (if present) can be adapted for coupling pipes, tubing, or other fluid conduits in fluid communication with suppressor 100 for routing fluid out of (or into) suppressor 100 during well operations or otherwise.

In at least one embodiment, suppressor 100 or a portion thereof, such as first end 102, can be advantageously adapted for containing fluid exiting or discharged from pack-off 18 and directing the fluid out of one or more ports 110 while at least partially minimizing or eliminating any leakage or discharge of fluid out of the top (with reference to the orientation of the Figures) of suppressor 100 during well operations, such as, for example, as wireline 14 moves through pack-off 18 and suppressor 100 while being removed from (or inserted into) a wellbore. Suppressor 100 can include a cap assembly 105 configured to be coupled with first end 102 of suppressor 100 for at least partially fluidically separating first internal space 118 from an atmosphere surrounding suppressor 100. In at least one embodiment, cap assembly 105 or a portion thereof can be removably coupled with body 101, in whole or in part, such as by way of mating threads 172 or other coupling means (e.g., quarter turn engagement, bolt-on flange, etc.).

In at least one embodiment, cap assembly 105 can include one or more caps, such as lids or other covers, for at least partially enclosing at least a portion of suppressor 100, such as first end 102 or first internal space 118. For example, cap assembly 105 can include a first cap 106 for coupling with first end 102 of body 101 and a second cap 108 for coupling with first cap 106. First cap 106 can be configured for removable coupling with body 101 (e.g., via mating threads 172) and the second cap 108 can be configured for removable coupling with first cap 106 (e.g., via mating threads 174). First cap 106 can have a first side 176, such as a bottom side, configured to at least partially communicate with first internal space 118 and a second side 178, such as a top side, opposite first side 176. First cap 106 can include one or more openings, such as a central opening 135 for allowing wireline 14 to pass therethrough and one or more vent holes 136 for venting first internal space 118 to the atmosphere (e.g., to at least partially resist the formation of a vacuum within suppressor 100). First cap 106 can include one or more fluid deflectors 120 for guiding or routing fluid discharged (e.g., upwardly) into suppressor 100 from pack-off 18 in one or more directions (e.g., radially inwardly, radially outwardly and/or downwardly, with reference to the exemplary orientation shown in the Figures, which is but one of many). Fluid deflector 120 can be coupled to first side 176 of first cap 106, which can include being formed integrally therewith in whole or in part. In at least one embodiment, fluid deflector 120 can be or include an at least partially tubular deflector body 180 having one or more side walls 182 and one or more end walls 184 for receiving fluid discharged from pack-off 18 (represented by arrow F in FIG. 5) and redirecting such fluid (represented by arrows R in FIG. 5) toward the floor 186 of first internal space 118 (e.g., the top of barrier 122) and ultimately toward and out of one or more ports 110. In at least one embodiment, deflector body 180 can have a single continuous sidewall 182. In at least one embodiment, deflector body 180 can have a plurality of sidewalls 182, which can but need not be contiguous, separately or in combination, in whole or in part.

Deflector body 180 can be cylindrical having a circular cross-sectional shape, but this need not be the case and alternatively, or collectively, deflector body 180 can have any cross-sectional shape according to an implementation of the disclosure, separately or in combination, in whole or in part (e.g., square, rectangular, oval, oblong, etc.). Further, the cross-sectional shape of deflector body 180 can, but need not, be constant along all or a portion of its length. For example, in at least one embodiment, one or more sidewalls 182 can be flared or angled relative to axis X such that at least a portion of fluid deflector 120 takes on a cone shape. In at least one embodiment, end wall 184 of fluid deflector 120 can be at least partially curved or domed, which can, but need not, include being at least partially spherical. A curved profile of this nature can help redirect fluid flow toward one or more fluid ports 110 or, for example, away from opening 135 in top 106. Alternatively, or collectively, end wall 184 of fluid deflector 120 can be at least partially flat. Fluid deflector 120 or deflector body 180 can be of any size or dimension according to an implementation of the disclosure. In at least one embodiment, deflector 120 can have a height less than a distance between floor 186 and first side 176 of first cap 106 when in a fully closed position. In at least one embodiment, deflector 120 can have an outside dimension less than an inside dimension of first internal space 118. Suppressor 100 can include one or more gaps 130, 132, such as voids or spaces, between fluid deflector 120 and surrounding structure for promoting fluid flow within or out of suppressor 100. Gaps 130, 132 can be any shape or size according to an implementation of the disclosure and can vary among embodiments based on, e.g., the overall size of or application for an implemented embodiment of suppressor 100 or, as another example, the type of fluid(s) or other discharge materials being suppressed.

In at least one embodiment, floor 186 can be at least partially shaped or contoured for supporting fluid flow out of first internal space 118 via one or more ports 110. For example, at least a portion of floor 186 can be sloped at an angle α in the radially outward direction relative to axis X (see, e.g., FIG. 5), which can help bias fluid radially outwardly toward one or more ports 110. Angle α can be any angle required or desired for an implementation of the disclosure, such as, for example, 5°, 10°, or another angle, which can be or include any angle up to and including 45° or more. In at least one embodiment, the entirety of floor 186 can be sloped, such as radially outwardly from opening 144 in barrier 122. However, that need not be the case, and in at least one embodiment, floor 186 can be at least partially flat (e.g., at least generally perpendicular to axis X). As seen in, e.g., FIGS. 3 and 5, in at least one embodiment, one or more fluid ports 110 can have an interior flow surface 188 disposed at or below the level of floor 186, e.g., at the point where floor 186 approaches or intersects interior surface 190 or wall 192 of body 101, which can help promote fluid flow or minimize flow resistance from first internal space 118 to port 110. However, this need not be the case, and in at least one embodiment, one or more fluid ports 110 or portions thereof can be disposed above or otherwise relative to floor 186.

In at least one embodiment, second side 178 of first cap 106 can be adapted for coupling with second cap 108 and one or more other components of suppressor 100. For example, first cap 106 can have a bore 194, such as an opening or other space, for holding one or more seals or sealing elements 196 and second cap 108 can be adapted for at least partially enclosing bore 194 (e.g., via meeting threads 174) to hold the one or more sealing elements 196 in place. In at least one embodiment, for instance, sealing element 196 can be or include one or more packings or rubbers for at least partially sealing with, cleaning, or wiping wireline 14 during well operations. In at least one embodiment, suppressor 100 can include one or more wear bushings 198 (e.g., made from brass or another material) disposed in bore 194 for at least partially extending the life of one or more sealing elements 196 due to contact with wireline 14 and/or fluids or other substances on wireline 14 as it moves back and forth through suppressor 100 during well operations. First cap 106 and second cap 108 can be removably coupled with one another for allowing convenient replacement of one or more sealing elements 196 and/or bushings 198 during use of suppressor 100. In at least one embodiment, suppressor 100 can include one or more face seals 138 for sealingly coupling first cap 106 and body 101 and/or for at least partially resisting uncoupling of first cap 106 from body 101 during operation (e.g., due to vibration, etc.). For instance, a face seal 138 can be or include one or more O-rings and corresponding grooves. First cap 106 and second cap 108 can optionally include one or more face seals for the same reasons; however, in at least one embodiment, such a seal may be omitted and one or more sealing elements 196 can provide adequate resistance to uncoupling of first cap 106 and second cap 108. In these manners, suppressor 100 can be adapted for at least partially resisting egress of fluid from any portion of suppressor 100 other than one or more ports 110 and fluid deflector 120 can be adapted for redirecting fluid discharged from pack-off 18 toward floor 186 of first internal space 118 and ultimately out of one or more ports 110 to one or more conduits (not shown) routed to one or more containers or other areas for storage or other disposition of the fluids discharged from pack-off 18.

In at least one embodiment, the present fluid discharge suppressor can include a body having a first end, a second end and one or more spaces, such as a first internal space, one or more first or other caps adapted to be coupled to the first end, one or more second or other caps adapted to be coupled to a first cap, and one or more fluid ports or other openings in or through one or more walls or other portion(s) of the body and in fluid communication with the first internal space or other portion(s) of the body. In at least one embodiment, a first cap and a second cap can have one or more central longitudinal openings or other openings, which can be adapted for allowing a wireline to pass through. In at least one embodiment, the one or more caps can be adapted to receive one or more packing elements. In at least one embodiment, the one or more caps can be adapted to at least partially resist removal of a packing element from one or more caps. In at least one embodiment, a fluid discharge suppressor can include one or more fluid deflectors disposed at least partially within an internal space. The deflectors can be coupled to one or more components of another device or system. In at least one embodiment, a fluid discharge suppressor can include a body having an end or other portion adapted to couple with a pack-off.

In at least one embodiment, a fluid discharge suppressor can include a barrier that at least partially separates a first internal space from a second internal space, such as within the body or a portion thereof. One or more internal spaces or one or more portions thereof can be adapted to receive at least a portion of a pack-off. In at least one embodiment, a fluid discharge suppressor can include a groove or other coupler disposed in a radially exterior surface or other portion of the body. The one or more grooves or other couplers can be adapted to couple with one or more clamps. In at least one embodiment, the one or more grooves can be adapted to circumscribe or otherwise at least partially surround at least a portion of a pack-off, for example, when the fluid discharge suppressor is coupled to a pack-off. In at least one embodiment, one or more barriers can include a central longitudinal or other opening adapted to couple with at least a portion of a pack-off.

In at least one embodiment, a fluid discharge suppressor can include a barrier that comprises a top or other portion at least partially disposed within one or more internal spaces. In at least one embodiment, the top of the barrier can be or include a floor or other portion of one or more internal spaces. In at least one embodiment, a fluid discharge suppressor can include a floor wherein at least a portion of the floor slopes downwardly, such as in a radial direction about a central longitudinal axis of the fluid discharge suppressor. In at least one embodiment, a fluid discharge suppressor can include one or more wear bushings, which can include one or more bushings coupled to one or more packing elements. In at least one embodiment, a fluid discharge suppressor can include a body having one or more longitudinal or otherwise arranged slots or other openings, which can include one or more slots or other openings adapted to couple with or receive at least a portion of a pack-off.

In at least one embodiment, a fluid discharge suppressor can include one or more fluid ports, which can include two fluid ports disposed radially or otherwise opposite one another, such as about an axis, plane or other reference. In at least one embodiment, a fluid discharge suppressor can include one or more fluid deflectors having a concave, convex, curved, or otherwise shaped portion for deflecting fluid away from one or more locations or toward one or more locations. In at least one embodiment, one or more fluid deflectors can include a tubular wall or other portion disposed within an interior of the body. In at least one embodiment, a fluid discharge suppressor can include a gap radially between an exterior surface or other portion of a fluid deflector and one or more other portions of the suppressor, such as an interior or other surface of the body. In at least one embodiment, a fluid discharge suppressor can include one or more conduits coupled to one or more ports, such as by way of fluid fittings, for routing fluid to one or more locations, which can include one or more storage tanks or other areas.

In at least one embodiment, a fluid discharge suppressor can include one or more vent holes through the first cap. One or more vent holes can be disposed radially between an exterior surface of a fluid deflector or a portion thereof, such as a tubular or other wall, and an interior surface of the suppressor or a portion thereof. One or more vent holes can be disposed in fluid communication with one or more gaps. In at least one embodiment, a fluid discharge suppressor or a portion thereof, such as one or more fluid deflectors, can be configured to receive and redirect fluid discharged from a pack-off or other well equipment.

In at least one embodiment, a fluid discharge suppressor can include a body having a first end with a first internal space and a longitudinally opposite second end with a second internal space, a first cap adapted to be removably coupled to the first end; a second cap adapted to be removably coupled to the first cap; an at least partially tubular wall coupled to the first cap and configured to be disposed at least partially within the first internal space; and one or more fluid ports through one or more walls of the body and in fluid communication with the first internal space. The first cap and the second cap can have central longitudinal openings for allowing a wireline to pass therethrough. The first cap can be adapted to receive one or more packing or sealing elements. The second cap can be adapted to at least partially resist removal of packing or sealing element from the first cap. The second end of the body can include an opening for allowing a wireline to pass therethrough. A fluid discharge suppressor can include two fluid ports disposed at 180 degrees from one another. One or more slots in the body (if present) can be disposed radially between the ports, such as 90 degrees from a port. Two or more ports or slots can be radially disposed in any position about an axis of the body relative to one another according to an implementation of the disclosure. One or more internal spaces of a suppressor can be at least partially separated by a barrier comprising at least one opening configured for allowing a wireline to pass therethrough. A suppressor or a portion thereof, such as one or more ends, can be configured to couple with at least one of a pack-off and a stuffing box, which can include receiving at least a portion of a pack-off or stuffing box therein.

Other and further embodiments utilizing one or more aspects of the disclosure described above can be devised without departing from the spirit of Applicant's disclosure. For example, while fluid discharge suppressor 100 is generally described in the context of being used for suppressing fluid discharge from a pack-off, this need not be the case and suppressor 100 can alternatively or collectively be used for suppressing fluid discharge from one or more other wireline or well operation components, such as a stuffing box or another component disposed fluidically between suppressor 100 and a wellbore. Further, the various embodiments of the present disclosure can be included in combination with each other to produce variations of the disclosed embodiments. Discussion of singular elements can include plural elements and vice-versa. The various steps described herein can be combined with other steps, interlineated with the stated steps, and/or split into multiple steps. Similarly, elements have been described functionally and can be embodied as separate components or can be combined into components having multiple functions.

Embodiments of the present disclosure have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A fluid discharge suppressor, comprising:
   a body having a first end, a second end and a first internal space;
   a groove disposed in a radially exterior surface of the body, wherein the groove is adapted to couple with a clamp;
   a first cap adapted to be coupled to the first end;
   a second cap adapted to be coupled to the first cap; and
   one or more fluid ports through one or more walls of the body and in fluid communication with the first internal space;
   wherein the first cap and the second cap have central longitudinal openings for allowing a wireline to pass therethrough;
   wherein the first cap is adapted to receive a packing element;
   wherein the second cap is adapted to at least partially resist removal of the packing element from the first cap;
   wherein the first cap comprises a fluid deflector disposed at least partially within the first internal space; and
   wherein the second end of the body is adapted to couple with a pack-off.

2. The fluid discharge suppressor of claim 1, wherein the groove is adapted to circumscribe at least a portion of the pack-off when the fluid discharge suppressor is coupled to the pack-off.

3. The fluid discharge suppressor of claim 1, further comprising a barrier that at least partially separates the first internal space from a second internal space of the body.

4. The fluid discharge suppressor of claim 3, wherein the second internal space is adapted to receive at least a portion of the pack-off.

5. The fluid discharge suppressor of claim 4, wherein the barrier comprises a central longitudinal opening adapted to couple with at least a portion of the pack-off.

6. The fluid discharge suppressor of claim 3, wherein the barrier comprises a top at least partially disposed within the first internal space and wherein said top of the barrier comprises a floor of the first internal space.

7. The fluid discharge suppressor of claim 6, wherein at least a portion of said floor slopes downwardly in a radial direction about a central longitudinal axis of the fluid discharge suppressor.

8. The fluid discharge suppressor of claim 6, wherein at least one of the one or more fluid ports intersects said floor.

9. The fluid discharge suppressor of claim 1, wherein the first cap comprises a bore adapted to receive the packing element and further comprising at least one of a packing element and a wear bushing at least partially disposed within the bore.

10. The fluid discharge suppressor of claim 1, wherein the body comprises one or more longitudinal slots adapted to couple with or receive at least a portion of the pack-off.

11. The fluid discharge suppressor of claim 1, wherein the one or more fluid ports comprise two fluid ports disposed radially opposite one another.

12. The fluid discharge suppressor of claim 1, wherein at least a portion of the fluid deflector is concave.

13. The fluid discharge suppressor of claim 1, wherein the fluid deflector comprises a tubular wall disposed within the first internal space and further comprising a gap disposed radially between an exterior surface of the tubular wall and an interior surface of the body.

14. The fluid discharge suppressor of claim 13, further comprising one or more vent holes through the first cap, wherein the one or more vent holes are disposed radially between the exterior surface of the tubular wall and the interior surface of the body in fluid communication with the gap.

15. The fluid discharge suppressor of claim 1, wherein the fluid deflector is configured to receive and redirect fluid discharged from the pack-off.

16. The fluid discharge suppressor of claim 1, wherein the fluid deflector is configured to receive and redirect fluid discharged from the pack-off.

17. The fluid discharge suppressor of claim 1, wherein the fluid deflector is configured to receive and redirect fluid discharged from the pack-off.

18. The fluid discharge suppressor of claim 1, wherein the fluid deflector is configured to receive and redirect fluid discharged from the pack-off.

19. A fluid discharge suppressor, comprising:
a body having a first end with a first internal space and a longitudinally opposite second end with a second internal space;
a first cap adapted to be removably coupled to the first end;
a second cap adapted to be removably coupled to the first cap;
an at least partially tubular wall coupled to the first cap and configured to be disposed at least partially within the first internal space; and
one or more fluid ports through one or more walls of the body and in fluid communication with the first internal space;
wherein the one or more fluid ports comprise two fluid ports disposed at 180 degrees from one another;
wherein the first cap and the second cap have central longitudinal openings for allowing a wireline to pass therethrough;
wherein the first cap is adapted to receive a packing element;
wherein the second cap is adapted to at least partially resist removal of the packing element from the first cap; and
wherein the second end of the body comprises an opening for allowing a wireline to pass therethrough.

20. The fluid discharge suppressor of claim 19, wherein the first and second internal spaces are at least partially separated by a barrier comprising at least one opening configured for allowing a wireline to pass therethrough.

21. The fluid discharge suppressor of claim 19, wherein the second end of the body is configured to couple with at least one of a pack-off and a stuffing box.

22. A fluid discharge suppressor, comprising:
a body having a first end, a second end and a first internal space;
a barrier that at least partially separates the first internal space from a second internal space of the body;
a first cap adapted to be coupled to the first end;
a second cap adapted to be coupled to the first cap; and
one or more fluid ports through one or more walls of the body and in fluid communication with the first internal space;
wherein the barrier comprises a top at least partially disposed within the first internal space and wherein said top of the barrier comprises a floor of the first internal space;
wherein the first cap and the second cap have central longitudinal openings for allowing a wireline to pass therethrough;
wherein the first cap is adapted to receive a packing element;
wherein the second cap is adapted to at least partially resist removal of the packing element from the first cap;
wherein the first cap comprises a fluid deflector disposed at least partially within the first internal space; and
wherein the second end of the body is adapted to couple with a pack-off.

23. The fluid discharge suppressor of claim 22, further comprising a groove disposed in a radially exterior surface of the body, wherein the groove is adapted to couple with a clamp.

24. The fluid discharge suppressor of claim 23, wherein the groove is adapted to circumscribe at least a portion of the pack-off when the fluid discharge suppressor is coupled to the pack-off.

25. The fluid discharge suppressor of claim 22, wherein at least a portion of said floor slopes downwardly in a radial direction about a central longitudinal axis of the fluid discharge suppressor.

26. The fluid discharge suppressor of claim 22, wherein at least one of the one or more fluid ports intersects said floor.

27. The fluid discharge suppressor of claim 22, wherein the fluid deflector is configured to receive and redirect fluid discharged from the pack-off.

28. A fluid discharge suppressor, comprising:
a body having a first end, a second end and a first internal space;
a first cap adapted to be coupled to the first end;
a second cap adapted to be coupled to the first cap; and
one or more fluid ports through one or more walls of the body and in fluid communication with the first internal space;
wherein the one or more fluid ports comprise two fluid ports disposed radially opposite one another;
wherein the first cap and the second cap have central longitudinal openings for allowing a wireline to pass therethrough;
wherein the first cap is adapted to receive a packing element;
wherein the second cap is adapted to at least partially resist removal of the packing element from the first cap;
wherein the first cap comprises a fluid deflector disposed at least partially within the first internal space; and
wherein the second end of the body is adapted to couple with a pack-off.

29. A fluid discharge suppressor, comprising:
a body having a first end, a second end and a first internal space;
a first cap adapted to be coupled to the first end;
a second cap adapted to be coupled to the first cap; and
one or more fluid ports through one or more walls of the body and in fluid communication with the first internal space;
wherein the first cap and the second cap have central longitudinal openings for allowing a wireline to pass therethrough;
wherein the first cap is adapted to receive a packing element;
wherein the second cap is adapted to at least partially resist removal of the packing element from the first cap;
wherein the first cap comprises a fluid deflector disposed at least partially within the first internal space;

wherein at least a portion of the fluid deflector is concave; and wherein the second end of the body is adapted to couple with a pack-off.

30. A fluid discharge suppressor, comprising:
a body having a first end, a second end and a first internal space;
a first cap adapted to be coupled to the first end;
a second cap adapted to be coupled to the first cap;
one or more fluid ports through one or more walls of the body and in fluid communication with the first internal space;
wherein the first cap and the second cap have central longitudinal openings for allowing a wireline to pass therethrough;
wherein the first cap is adapted to receive a packing element;
wherein the second cap is adapted to at least partially resist removal of the packing element from the first cap;
wherein the first cap comprises a fluid deflector disposed at least partially within the first internal space;
wherein the fluid deflector comprises a tubular wall disposed within the first internal space and further comprising a gap disposed radially between an exterior surface of the tubular wall and an interior surface of the body;
further comprising one or more vent holes through the first cap, wherein the one or more vent holes are disposed radially between the exterior surface of the tubular wall and the interior surface of the body in fluid communication with the gap; and
wherein the second end of the body is adapted to couple with a pack-off.

* * * * *